May 17, 1955  J. R. GREENO ET AL  2,708,461
APPARATUS FOR ASSEMBLING COIL SPRING UNITS
Filed March 29, 1951  6 Sheets-Sheet 1
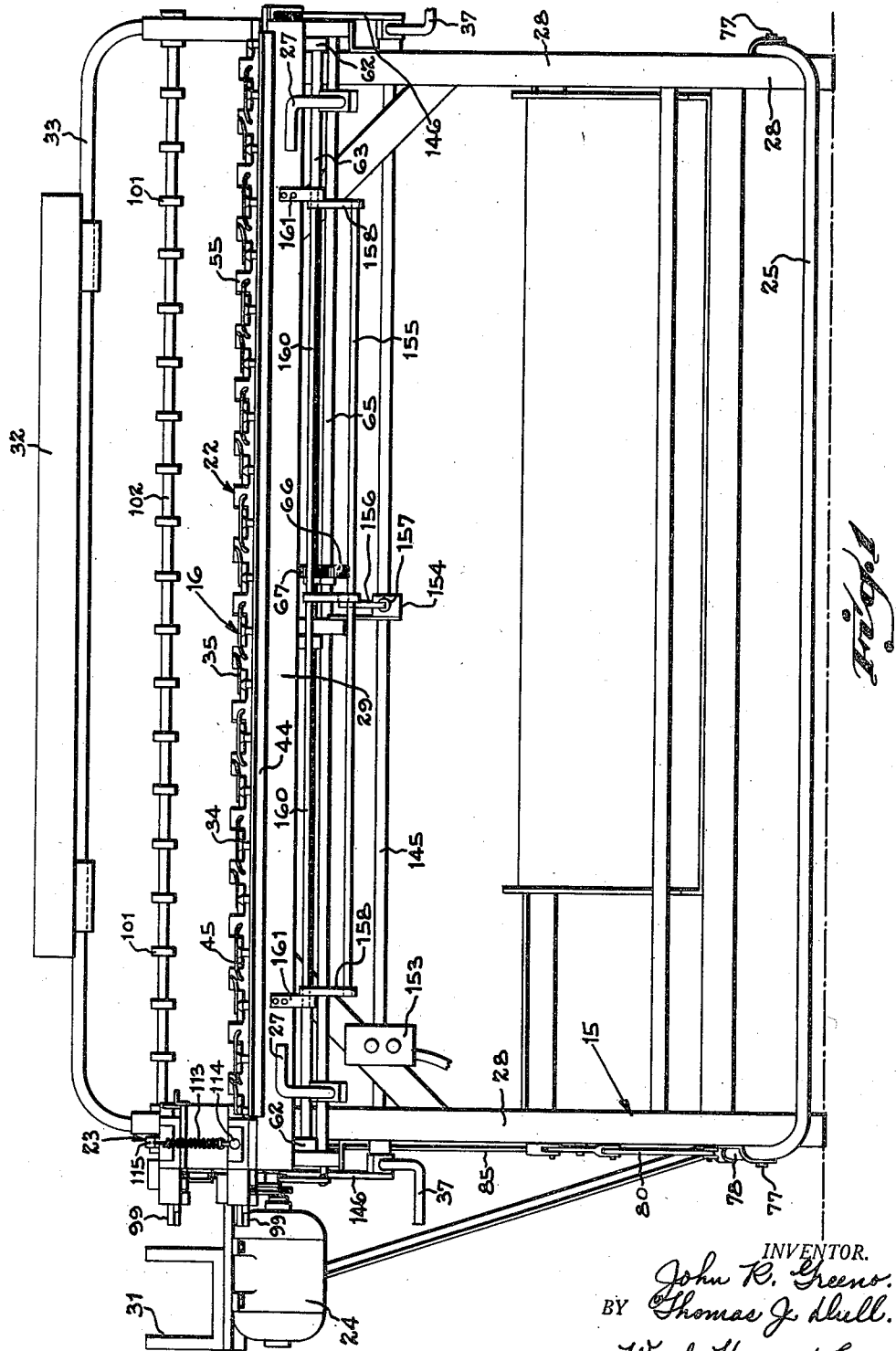
INVENTOR.
John R. Greeno.
BY Thomas J. Hull.
Wood, Herron & Evans.
ATTORNEYS.

May 17, 1955   J. R. GREENO ET AL   2,708,461
APPARATUS FOR ASSEMBLING COIL SPRING UNITS
Filed March 29, 1951   6 Sheets-Sheet 2
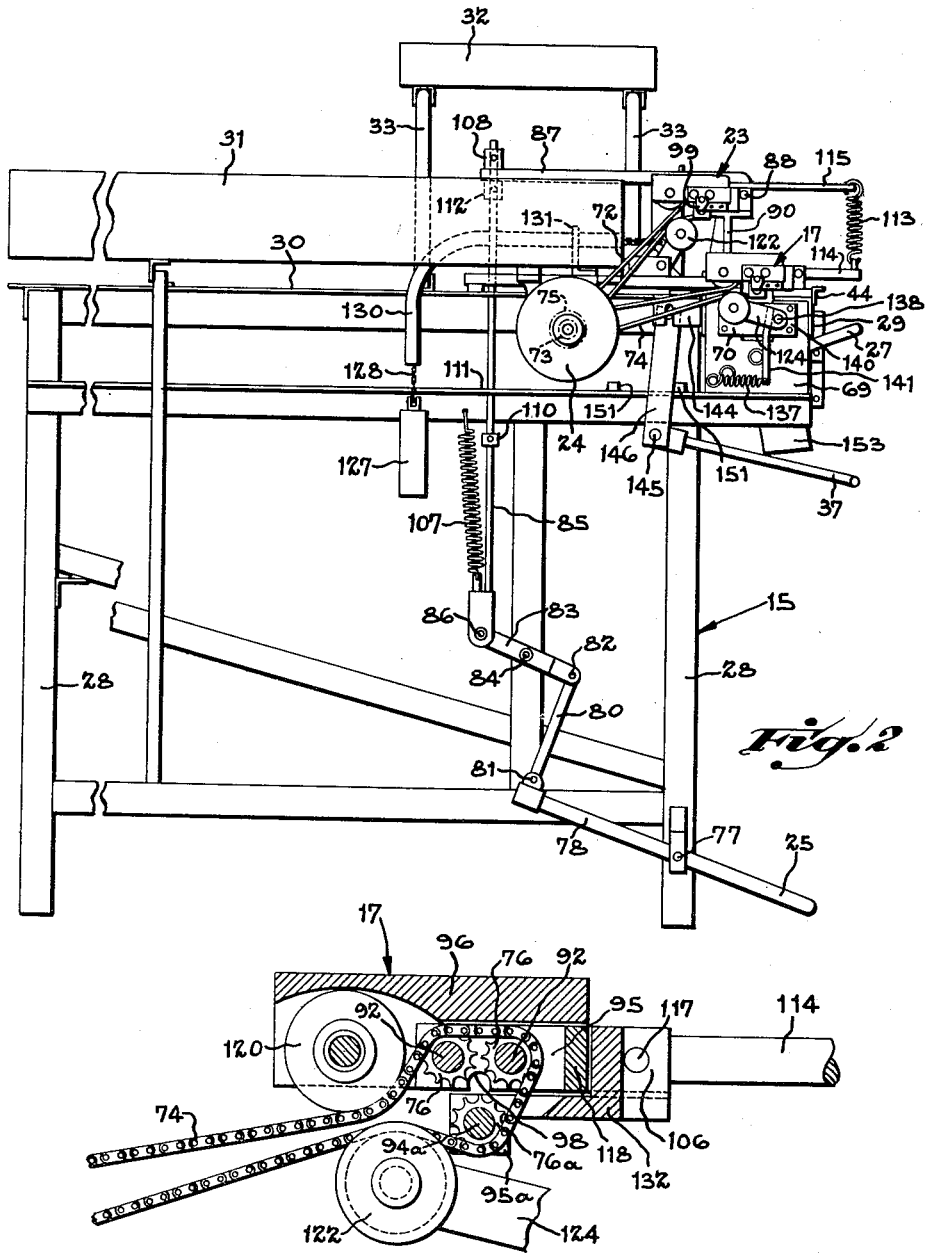

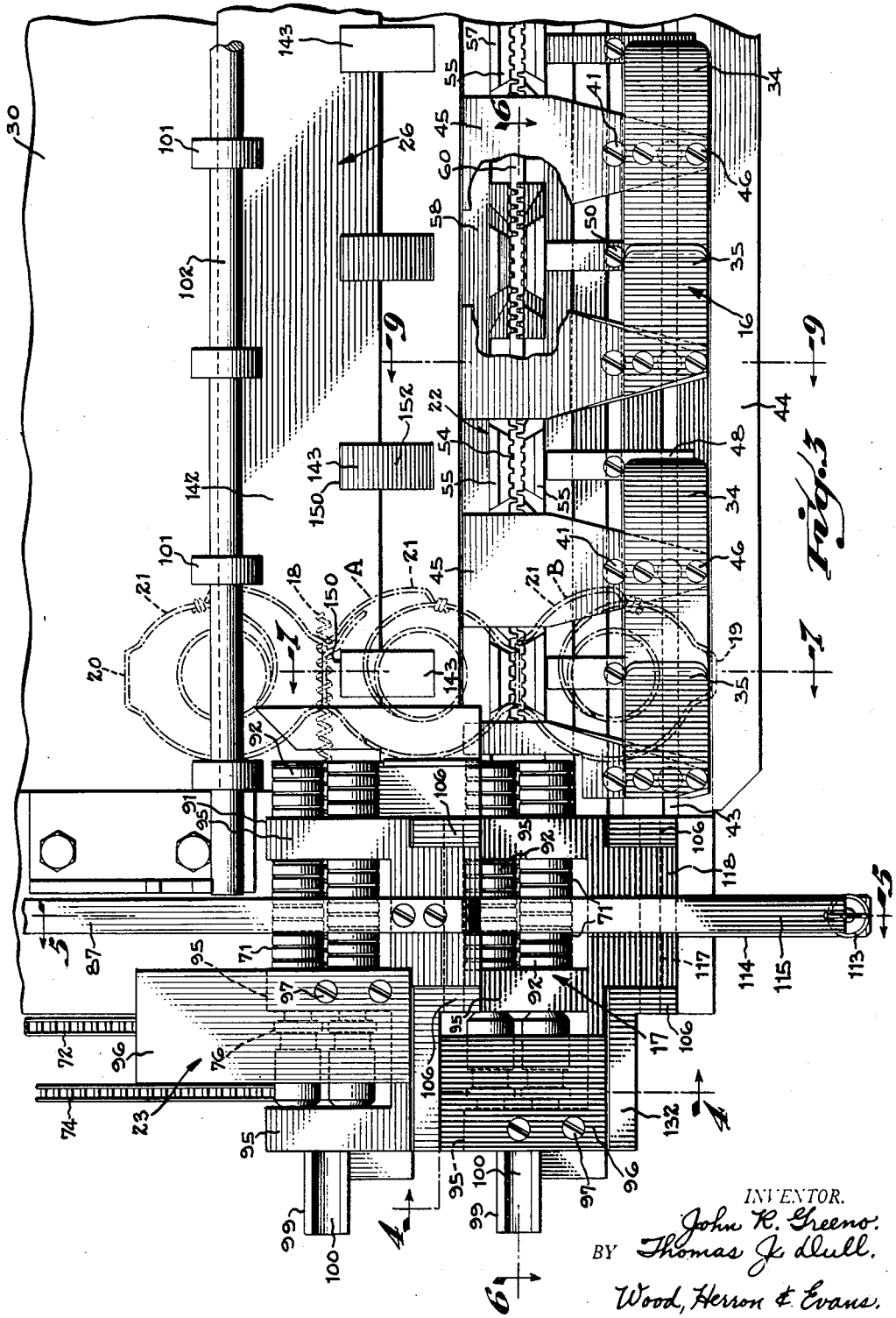

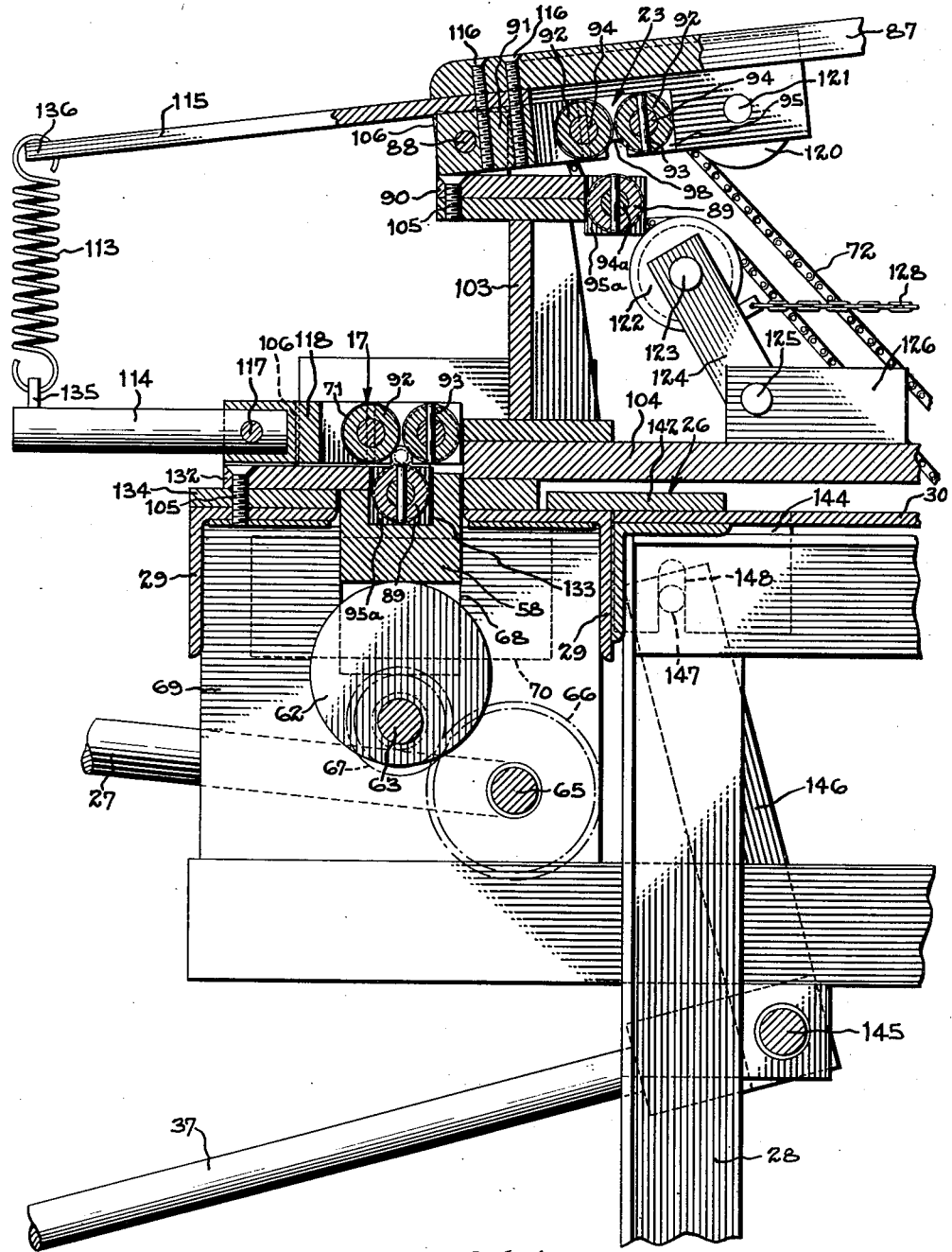

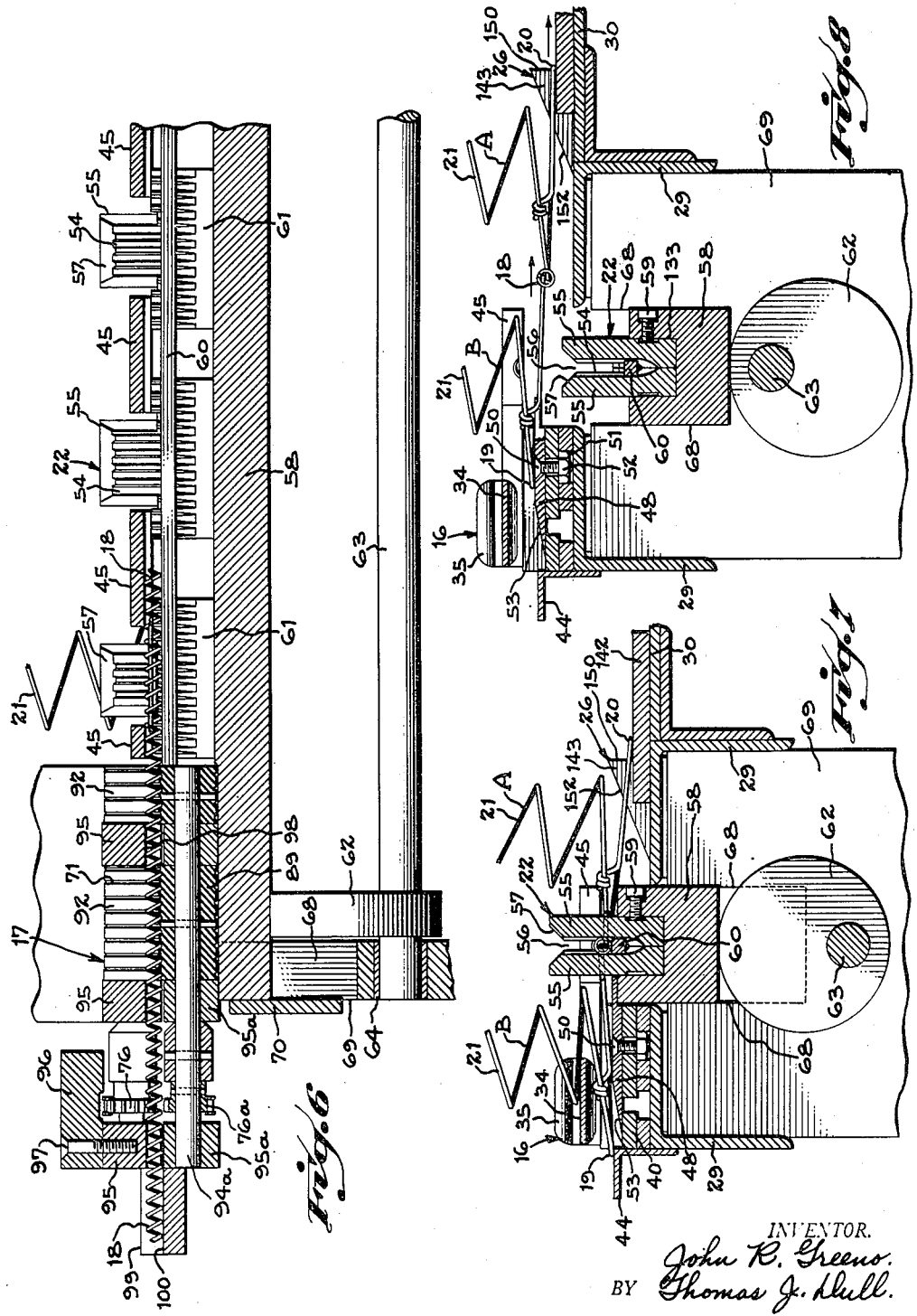

INVENTOR.
John R. Greeno.
BY Thomas J. Hull.
Wood, Herron & Evans.
ATTORNEYS.

United States Patent Office 2,708,461
Patented May 17, 1955

2,708,461

APPARATUS FOR ASSEMBLING COIL SPRING UNITS

John R. Greeno and Thomas J. Dull, Cincinnati, Ohio, assignors to John R. Greeno Co., Cincinnati, Ohio, a corporation of Ohio Application March 29, 1951, Serial No. 218,170

6 Claims. (Cl. 140—92.7)

This invention relates to an improved machine for assembling coil spring mattresses, bed springs, cushions, and similar units made up of coil springs in longitudinal rows hingedly joined together by helical wires threaded or woven upon mating portions of adjoining rows of springs.

Spring units of this construction are well known, the coil springs being generally of hour glass shape with enlarged terminal coils at top and bottom, collectively defining the surface of the spring assembly. The top and bottom terminal coils include straight portions at diametrically opposite sides which are offset outwardly from the coils. When the individual coils are placed in rows for assembly, these offset portions are located between the rows so as to mate with corresponding offset portions of the coils in adjoining rows and the helical is advanced or screwed upon the mating portions in corkscrew fashion to join them together.

The helical wires are longitudinally coextensive with the rows and advance from one spring to the next, thus tying them together longitudinally and also tying the rows transversely to one another. The helical wires are preferably applied both to the top and bottom terminal coils to form a stable spring unit, and the hinge connection, combined with the flexibility of the helical, permits the individual coils to cooperate with one another to produce a spring unit of controlled flexibility and lateral stability. The spring unit is assembled by adding successive rows of coil springs in this manner until the full width of the unit is developed.

Assembling coil springs in this manner by hand is extremely difficult and slow because the coils individually must be held precisely in formation while the turns of the helical are tediously guided and advanced upon the mating spring portions. On the other hand, automatic machines have not been completely successful because by their very nature, the coil springs and helicals are not susceptible to casual handling in an automatic way.

One of the primary objects of the present invention has been to provide a relatively simple, semi-automatic machine in which the individual coil springs are inserted with their bottom terminal coils mated accurately in assembling position with respect to one another both longitudinally and transversely, combined with power means for advancing and at the same time guiding a helical wire in a positive manner upon the mating offsets such that the leading end of the helical threads itself automatically without interference upon them as it advances from coil to coil.

Within the machine, after the coils are being approximately positioned, as by hand or from a feeder chute, the springs are adjusted automatically to final mating position with the assembly, and they are confined in such position during the threading operation. Thus, in the present structure, the tedious threading operation is performed automatically and the spring positioning, which is difficult to perform automatically, is accomplished in a simple manner.

It has been discovered that if the lower terminal coils are accurately joined together in assembly and sustained on a flat surface, then the upper terminals will fall of their own accord into similar mating positions. This permits the helical to be applied to the top terminals by guiding it manually upon the free mating portions. Another important object of the invention therefore has been to provide an improved mechanism for positioning and joining the lower terminals accurately, combined with a horizontal support surface and second helical feed mechanism arranged to apply a second helical upon the free, self-mating top terminals and thereby to simplify the machine and its mode of operation without sacrificing materially the production speed and quality.

The top helical feeder is displaced rearwardly from the lower, a distance corresponding to the diameter of the terminal coils. When the bottom terminals of two adjacent rows of coils are in position to receive the lower helical, by which they are to be joined, the free top terminals of the last joined rows of springs are aligned with the top helical feeder in position to receive the top helical. Thus, the threading operations are performed alternately at the top and bottom terminals, the assembled spring unit being advanced rearwardly in stepwise fashion across the support surface as each successive row is applied to the assembly.

In its simplest form, the machine may be of semiautomatic nature, the individual springs being located manually in longitudinal formation in a receiving section at the front of the machine in position to mate with the last row of the assembled coils for application of the helical to the terminal coils, and the operations of the machine may thus be regulated manually. Such a machine is disclosed herein, but it will be understood that the assembling device as disclosed is particularly well suited for use in conjunction with machine feeders to further reduce hand labor.

Briefly described, the improved machine consists of a spring receiving section arranged to temporarily maintain the individual coil springs in position for assembly, a table for supporting the assembly in horizontal position as it is advanced through the machine, and upper and lower power driven helical feeding units to rotate the helicals or to form them from reeled wire and rotatively advance them. In addition, a horizontally movable indexing mechanism is arranged to advance the spring assembly in steps as each coil row is applied, and a vertically movable coil positioning assembly is provided for holding the adjoining portions of the bottom terminal coils in mating position and guide the leading end of the helical in a positive manner upon them. The machine further includes manual levers for operating the indexing mechanism and for raising and lowering the coil positioning apparatus, to permit advancement of the coil assembly after each operation, and a treadle or other suitable device arranged to selectively control the operation of the helical feeding units such that the operation is at all times under the complete direction of the operator.

The machine is designed particularly for use in the assembling of springs having straight sections offset outwardly from the circumference of the terminal coils and of differential length at opposite sides. Such springs are conventional in the trade at present. When such coils are placed in rows with the offsets arranged one above the other, the offsets mate and accommodate the threading of the helical wire upon them. It will be understood however, that other types of springs are within the purview of the present disclosure.

A further object of the invention has been to provide an improved coil positioning structure arranged to interfit the mating offset portions of different length of adjoining springs so as to position them accurately with respect to one another, both longitudinally and transversely, combined with helical guide members coextensive with the spring rows for guiding the helical into threaded engagement with the springs and thereby avoid interference or misthreading as the leading end of the helical advances from coil to coil.

The spring receiving section which maintains the individual coil springs in longitudinal assembly formation is related to the coil positioning apparatus in such manner that the rearward portions of the coils overhang the positioning mechanism. The positioning mechanism essentially constitutes a series of spaced jaws, one set for each coil, the jaws having their open ends facing upwardly and being arranged to confine the offset portions between them when in elevated position and to release them when lowered. The indexing apparatus is arranged to shift the spring assembly rearwardly when the positioning jaws are lowered to free the terminal coils, such that the offset portions at the trailing edge of the assembly, upon being indexed, are disposed in vertical alignment with the open jaws in position to mate with a new row of coils inserted in the receiving section. Thus, when the new row of individual coil springs is inserted in the receiving section, the rearward offsets of these springs will overlie the trailing offsets. Conversely, when the positioning mechanism is again elevated, the jaws confine the mating offsets in aligned position suitable to receive the helical as it is threaded upon them.

A further object of the invention has been to provide a spring receiving section arranged to permit convenient insertion and location of the springs in a rapid convenient manner and maintain them firmly in longitudinal formation under predetermined spring pressure, and to permit the springs, after assembly, to be drawn inwardly through the receiving section upon operation of the indexing mechanism. After the springs are installed at the receiving section at the front of the machine, with the rearward portions of their terminals overhanging the positioning mechanism, they are automatically brought to final alignment by the positioning mechanism when it is elevated. For this purpose the positioning jaws are provided with converging surfaces which, as the jaws elevate, engage the mating offsets and shift or coerce them into alignment with one another.

The helicals utilized for joining the rows of springs may either be preformed lengths of helically wound spring wire, or wire helically wound in continuous length and fed from a reel. In the alternative, helical forming heads of the type known in the art may be positioned adjacent the helical feeding units to form the helicals from reeled plain wire of suitable size and temper. Since the formation of helicals is well known in the art, the present invention is disclosed merely in relation to feeders adapted to advance preformed lengths of helically wound wire to the springs during the machine operation. Such preformed wire, previously cut to the predetermined length of a row of springs, has, in fact, been found to be as advantageous in production operations as the forming of the helicals as they are needed, since the starting and stopping of any helical forming mechanism places a heavy burden on the forming mechanism which leads to uncertainty of operation.

The helical feeding units as just discussed each consist of sets of rollers spaced at equally distant points around the helical, the respective rollers having staggered grooves arranged to establish a positive engagement with the points of contact upon the helical wire in order to advance the helical in a positive manner. These units are mounted respectively in plane with the top and bottom terminal coils and located horizontally in positions to feed the helicals directly upon the mating offsets at top and bottom. The rollers of each set are separable and are arranged to develop a pressure engagement upon the helical wire in order to rotate the helical by friction. Both sets of rollers are driven in common from an electrical motor which preferably is driven continuously during operation of the machine, the advance of the helicals being controlled by pressure applied upon the rollers.

A further object of the invention has been to provide a treadle operated control system which is common to both the upper and lower feeding units and which controls directly the feeding pressure of the upper feeding unit upon depression of the treadle, while the lower unit is under a constant feeding pressure which is increased when the treadle is depressed.

In the preferred mode of operation, the lower helical is inserted in its feeder first, and because of the constant feed pressure, the helical is threaded automatically across the coils by operation of the helical guides. After the lower helical is started, the upper is then inserted in its feeder and the treadle depressed to apply feeding pressure to the upper rollers intermittently as the helical is guided manually from coil to coil. Each time the treadle is depressed, additional feeding pressure also is applied to the lower feeder. This dual treadle operation is desirable because it is found in operation that the lower helical sometimes is impeded by turning resistance or other causes and the intermittent increase in pressure jogs or restarts it in an automatic manner. The control treadle is coextensive with the machine for operation at any point across the spring assembly as the operator guides the upper helical across the coils.

In addition to the treadle operated control system for governing the advancement of the helicals, the machine is arranged to retract the helical by rotating it in a reverse direction should it become jammed or misapplied during its advancement. This arrangement is intended particularly for use in threading the helical upon the top terminal coils since this operation requires manual guidance. For the purpose, a reversible motor preferably is employed to drive the feed units, and a reversing switch is interconnected with the motor and controlled by a movable bar coextensive with the front of the machine. Thus, the operator governs the advancement of the helical by depressing the treadle and at the same time, guides the leading end of the helical as it advances from spring to spring. Should misalignment occur, the operator may push against the control bar with his body so that the helical can be retracted. Releasing the bar, of course, causes the helical again to be advanced so that the operator can guide it correctly upon the coils.

To stabilize the top terminal of a mating pair of springs and insure registration of the offset portions with one another longitudinally, the machine is equipped with a top terminal guide. This is located above the table near the top feeding unit in position to engage on diametrically opposite sides of the top terminal coils and thereby to hold them accurately in position while the helical is threaded upon them. The guide is stationary and the successive rows of terminals pass transversely through it as they are advanced stepwise through the machine.

In place of the top terminal guide, a coil positioning apparatus for the top terminals may be utilized, duplicating the bottom positioning apparatus. This mechanism, mounted above the top terminals, with the open jaws facing downwardly and including threading teeth for advancing the top helical in the same manner as the bottom one, eliminates the hand guiding of the top helical.

Further objects and advantages of the invention will be more fully apparent to those skilled in the art from the following detailed description taken in conjunction with the drawings.

In the drawings:

Figure 1 is a front elevation showing the general arrangement of the machine.

Figure 2 is an end view further illustrating the general assembly.

Figure 3 is an enlarged fragmentary top plan view illustrating the mechanism for feeding the top and bottom helical wires, together with the mechanism for positioning the lower terminal coils and guiding the helical as it is threaded upon them.

Figure 4 is a sectional view taken on line 4—4, Figure 3, illustrating the sprocket chain drive for the lower feed unit.

Figure 5 is a sectional view taken on line 5—5, Figure 3, illustrating the relationship of upper and lower feed units and associated mechanism.

Figure 6 is a longitudinal sectional view taken on line 6—6, Figure 3, detailing the lower feed unit and the associated coil positioning and helical guide mechanism.

Figure 7 is a cross sectional view taken on line 7—7, Figure 3, further detailing the coil positioning mechanism and coil receiving section.

Figure 8 is a sectional view similar to Figure 7, showing the coil positioning mechanism in lowered position and the movement of the indexing mechanism for shifting a row of assembled coil springs transversely to position them for the next threading operation.

*General structure and operation*

Described with reference to Figures 1 and 2, the machine generally embodies a frame indicated at 15, having a spring receiving section 16 at its forward edge adapted to retain successive rows of coil springs in position to be assembled. The individual springs are inserted manually into the receiving section by the operator, then the machine is operated to thread or weave a helical wire longitudinally through the lower and upper ends of contiguous rows of coils, to unite them. The operation of inserting the individual springs in longitudinal formation, then joining them to the edge of an adjoining row is repeated row-by-row, the spring assembly being advanced stepwise through the machine as successive rows are added.

Figure 10:
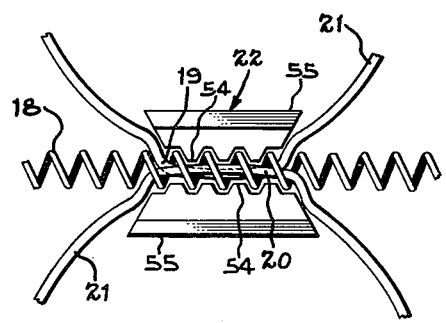
Figure 10 is an enlarged fragmentary view detailing a mating pair of assembled coil springs and related positioning blocks.

Upon being inserted in the receiving section 16, the coil springs 21 are maintained under a slight compression with a portion of their lower terminal coils overlying corresponding portions at the trailing edge of a previously joined row of springs (Figures 3 and 7). In this position, a helical wire is advanced and threaded upon the mating offset portions of the adjoining coils by the lower feed unit indicated generally at 17 (Figures 5 and 6). In order to facilitate threading of the helical, the upper and lower terminal coils are each provided with a pair of straight sections 19 and 20 which are offset outwardly from the circumference of the terminal coils and arranged to mate with one another (Figure 10). The helical wire 18 is threaded upon overlying offset portions 19 and 20 with the mating offset portions held in assembled relationship by the coil positioning block assembly indicated generally at 22.

As hereinafter described in detail, the coil positioning blocks are provided with cooperating toothed faces so arranged that the confined offset portions are maintained accurately in alignment overlapping one another while the rotating helical wire is engaged by the teeth so as to thread itself automatically and in a positive manner about the offset portions. This hinges the adjoining longitudinal rows of coils transversely to one another and locks each coil longitudinally in position. In the present embodiment, the helical wire is guided longitudinally along the bottom terminals by the positioning block assembly 22 in an automatic manner and is guided by hand upon the upper coils of the springs as it is advanced by the upper feed unit indicated generally at 23 (Figure 5). If desired, however, a coil positioning block assembly of duplicate construction may be applied to the upper feed unit 23 in order to guide the helical automatically upon both ends of the coils.

In the present embodiment both the lower and upper feed units 17 and 23 are driven in common by the motor 24, Figure 1, but the upper mechanism is driven at a slower rate to allow the operator time to guide the advancing rotating helical upon the mating offset portions of the upper coils. Advancement of the upper helical is controlled by depressing a treadle 25 (Figures 1 and 2), which applies pressure to the upper feeder and also increases the pressure of the lower unit as previously noted.

In starting to assemble a bed spring unit or similar assembly of coil springs as shown in Figures 3, 7, and 8, a longitudinal row of coil springs as indicated at A, is first positioned in the machine with alternate offset portions 19 and 20 confined between the positioning blocks. A row of coil springs indicated at B is then placed under slight compression in the receiving section 16, the offset portion of each terminal coil being interposed between the positioning blocks overlying the mating offsets of the adjacent spring and under pressure engagement upon it to hold it in place. It will be noted that in the preferred arrangement shown, the underlying offset 19 (Figure 10), is slightly narrower than the offset 20 which overlies it so that the mating offsets will accommodate the leading end of the helical wire without interference as the advancing wire follows the teeth of the locating blocks.

After a helical wire is threaded upon the adjoining portions of the first two rows of springs to connect them, the united rows are shifted or indexed rearwardly by manual operation of the indexing mechanism generally indicated at 26 in Figures 3 and 7. However, before indexing, the positioning mechanism 22 is lowered as shown in Figure 8 to release the terminal coils and helical and permit the assembly to be pulled rearwardly. The indexing mechanism is arranged automatically to position the trailing offsets of row B in alignment with the opening between the positioning blocks; thus when the next row of coil springs is inserted in the receiving section and the positioning mechanism again elevated, the offsets of row B will be confined with the mating offsets of the new row in position to be engaged by the advancing helical.

The indexing movement is equal to the distance across the offset portions so that the spring assembly is advanced transversely step-by-step upon addition of each longitudinal row of coil springs. In practice it is preferable to feed the helical upon the lower terminals of the springs first and then feed it upon the upper terminals, the upper feeding unit being located one step or coil rearwardly of the lower unit. In other words, after the first two rows are joined, their upper terminal coils, which include similar mating offsets, are indexed into alignment with the upper feed unit and the helical is advanced and guided by hand upon them.

The helical feed is controlled by the above noted feed control treadle 25. In addition, a manual control lever 27 is provided for raising and lowering the positioning block assembly, and a second manual lever 37 is provided for shifting the indexing mechanism. The essential operations for joining each row of coil springs thus consists in inserting the coils individually in the receiving section, elevating the positioning mechanism, and inserting a helical in the lower and upper feeders. After insertion, the lower helical feeds automatically across the coil assembly and concurrently, a helical is now inserted in the upper feed unit and the treadle depressed intermittently to apply the helical to the upper terminal coils. The indexing mechanism is now actuated for the nex row and the sequence is repeated in this order for each successive row of springs. The structural details and operation of the various components of the machine are described hereinafter under various headings in this specification.

*Spring receiving section*

The machine frame 15 as best disclosed in Figures 1 and 2, is frabricated of structural steel members supported upon legs 28, suitably braced to constitute a rigid support. The forward portion of the frame is provided with angle irons 29—29 (Figure 5) for supporting the operating parts of the machine while the rearward portion of the base constitutes a table top 30 for supporting the spring unit as it is progressively assembled. As viewed in Figure 1, the left end of the frame is provided with a trough 31 for storing a supply of preformed helical wires to be introduced manually into the machine and a supply of coil springs is carried in a receptacle 32. The receptacle 32 is supported above the machine in a position convenient to the operator upon a pair of U-shaped support bars 33—33 having their lower ends secured upon opposite ends of the machine frame.

The coil receiving section 16 is mounted upon the forward side of the machine upon the angle iron 29 as shown in Figures 7 and 8 and is arranged to receive the coil springs and maintain their lower turns slightly under compression to maintain them securely in formation. The individual coil springs 21 are located at spaced relationship with one another in a longitudinal row with their rearward portions overhanging the positioning blocks to be joined to corresponding portions of the spring assembly upon application of the helical.

The retaining section is arranged to receive the springs as they are inserted at the forward side and to permit them to be withdrawn rearwardly by the indexing mechanism 26 after they are joined by the helical to the spring assembly. In other words, the receiving section establishes a predetermined wedging engagement with the spiral portion rising from the terminal coils with the terminal coils seated upon a supporting surface, the individual coils being spaced from one another by means of spacer blocks interposed between adjacent coils. The spring engagement is such that the springs, after being joined to the assembly, may be withdrawn through the receiving section as part of the assembly.

The individual coil springs 21 are duplicates of one another and the wide and narrow offset portions 19 and 20 are located at diametrically opposite sides of the terminal coils to provide an interfit for the helical when placed side by side. The position of the wide and narrow offsets is reversed with respect to the top and bottom terminals, in other words, a wide and narrow offset is presented along each side of the spring. The preferred mode of assembling these springs is to alternate the disposition of the wide and narrow offset portions from spring to spring longitudinally in rows. In this manner the spiral rises from alternate sides of the terminals from spring to spring and any variations in resiliency or angular resistance to deflection of adjacent springs is balanced between them, thus providing greater uniformity of cushioning defect throughout the assembled spring unit.

The mating wide and narrow offset portions, as above noted, facilitate the threading of the helical upon them since the ends of the offsets are staggered with respect to one another corresponding to the lead of the helical and are related to the teeth of the positioning blocks. The accurate relationship of the mating offsets with respect to one another is critical and as hereinafter described in detail, the individual positioning blocks of assembly 22 are alternately wide and narrow to nest closely with the alternate wide and narrow offsets (Figure 3). The spring receiving section 16 and positioning block assembly 22 cooperate with one another, the receiving section 16 serving to hold the individual springs in predetermined formation before joining while the positioning block assembly 22 confines the individual springs in mating position with respect to the spring assembly.

Figure 9:
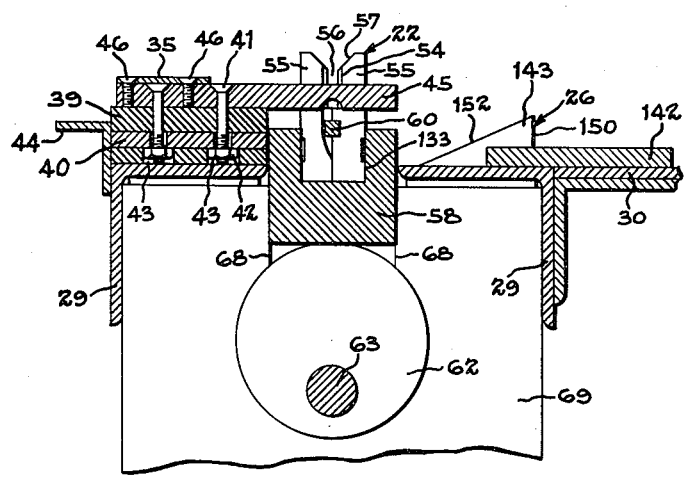
Figure 9 is a sectional view generally similar to Figure 7, taken on line 9—9, Figure 3, and detailing the position and arrangement of one of the guide plates which are interposed between the positioning blocks for guiding the helical as it advances through the successive positioning blocks.
Figure 11:
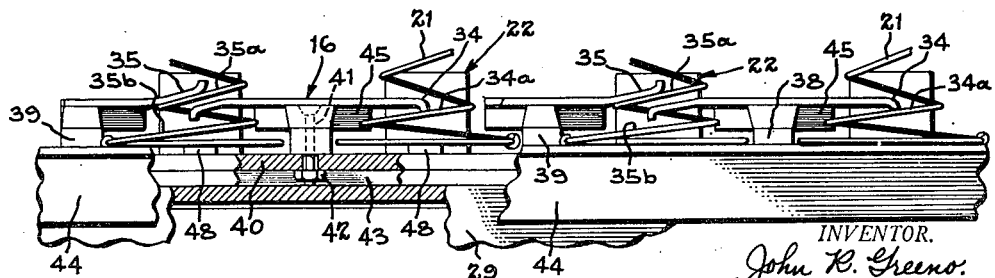
Figure 11 is an enlarged fragmentary front elevation taken from Figure 1, further detailing the spring receiving section.

The spring receiving section 16 is best disclosed in Figures 3, 7, and 11, and consists of a series of retainer limbs arranged to engage the coil portion spiralling upwardly from alternate sides of adjoining springs. It will be observed in Figure 11 that the retainer limb 34 overlies the rising spiral 34a at the approximate center of the coil spring as viewed from the front and the retainer limb 35 engages the first full turn of the spiral as indicated at 35a, also at the approximate center of the spring. The limbs 34 and 35 are mounted upon respective spacers 38 and 39 in spaced relationship to a slotted base plate 40 (Figure 9). In order to provide lateral adjustment of the limbs, the spacers are secured by means of screws 41 having nuts 42 engaged in the T-slot 43 formed in the base plate.

As previously noted the springs are inserted into the receiving section rotated in relation to one another to present the wide and narrow offsets in alternate positions; consequently the spiral rising from the terminal coils varies alternately from spring to spring. For this reason, the retainer limbs are arranged to engage the spiral at alternate elevations corresponding to the elevation of the spirals of adjacent springs. Thus, as shown in Figure 11, the limbs 34 and 35 are located on different planes and each overhangs the spiral from the left side. By this arrangement the limb extends across the open side of the spiral to permit the coil spring to be withdrawn without interferences rearwardly through the receiving section after having been joined to the assembly.

It will be observed in Figure 11 that the overhanging end of the retainer limb 35 is angulated slightly to conform with the lead of the spiral which it engages. The forward offset portions of the coil springs rest upon an angle iron 44 which is secured to the edge of the angle 29 in the manner shown in Figures 3 and 7. The edge of angle 44 thus provides a guide to align the coil springs with one another as they are manually inserted and pushed inwardly of the receiving section and any slight variations in alignment will be corrected by the positioning block assembly 22 when it is elevated.

In addition to the retainer limbs, the spacer blocks 38 and 39 also carry rearwardly extending guide plates 45 which overlie the positioning blocks and in combination with the blocks provide a longitudinal passageway to guide the helical as it advances through the machine. The function of the guide is more clearly disclosed in the detailed description of the guide block assembly. The guide plates 45, as shown in Figure 9, are secured directly upon the upper ends of the spacer blocks by the screws 41 and the retainer limbs 34 and 35 are secured by screws 46 threaded into the guide plates.

In addition to the guide plates and retainer limbs, the receiving section 16 further is provided with a series of stop bars 48 which overhang the slotted base plate 40 arranged to engage the spacer block assembly to limit its upward movement as shown in Figures 3 and 7. The stop bars are secured by means of screws 50 passing downwardly through a second T-slot 51 formed in the base plate and engaging a nut 52 confined in the slot. The outer or leading end of the stop bars are inclined as at 53 (Figure 7) to provide a skid and thereby facilitate the insertion of the terminal coils.

In the preferred mode of operation the coil springs are inserted by placing their terminal coils between the spacer blocks 38 and 39, then pressing them inwardly to cause the rising spiral portion of the coil to engage either the overhanging limb 34 or 35 depending upon the position of the spring. To aid in inserting them the spiral may be compressed slightly to clear the retainer limbs and after being released, the expanding spiral will hold them securely in position for subsequent withdrawal after they are joined.

The positioning block assembly 22 is lowered during the loading operation to the position shown in Figure 8 in order to clear the terminal coils, with the terminal coils of the previously joined row positioned just above the open throat of the positioning blocks as shown. In this manner the newly inserted terminal coils will overlie the mating terminal coils in approximate alignment with the positioning blocks so that upon being elevated, the offset portions will be adjusted automatically to final position by the converging throat of the positioning blocks as hereinafter described. The pressure engagement of the retainer limbs is, of course, sufficient to maintain the springs in position but is insufficient to prevent the indexing mechanism 26 from withdrawing them after the helical is applied.

*Positioning block assembly*

As shown in Figure 3, the positioning block assembly 22 is located immediately behind the receiving section 16 and carries a series of spaced positioning blocks 55—55 providing an open throat 56 having a converging opening 57 at its upper end arranged to guide the offset portions into the throat when the assembly is elevated to the position shown in Figure 7. These blocks are arranged to hold the adjoining offsets in alignment transversely with one another and also to position them longitudinally so that the ends of the offsets are located in positions corresponding to the lead of the helical wire 18 as it is threaded upon them. As viewed from above, as in Figure 3, the ends of the positioning blocks are configurated to nest with the ends of the respective offsets 19 and 20, the wide and narrow blocks being alternately related to one another to accommodate the alternate placement of the springs as above noted.

The inner faces of the respective blocks are provided with a series of teeth 54 which are staggered with respect to one another so as to provide a threaded engagement with the opposite sides of the rotating helical wire, the spacing of the teeth being substantially the same as the lead of the helical wire. The blocks are mounted collectively in a channel shaped bar 58, the lower portions of the blocks being clamped in the bar by means of a set screw 59 (Figure 7). As shown in Figure 6, an elongated bar 60 is interposed between the jaws to maintain a spacing between them and to support the helical wire as it advances.

It will also be observed that the blocks are provided with wide portions 61 rising from the bar 58 and terminating below the guide plates 45 so as to provide an extended tooth portion for guiding the helical from block to block. Thus, the stop bars 48 locate the block assembly accurately below the guide plates, and the guide plates being interposed between the narrow portions of the positioning blocks, provide in combination with the elongated bar 60, a substantially continuous passageway for the advancing helical. As shown in Figures 6 and 7, the guide plates 45 are provided with arcuate grooves upon their undersurfaces so as to guide the helical in the horizontal plane, and the guide plates 45 and bar 60 guide it in the vertical plane.

The positioning blocks are raised and lowered as a unit by means of a pair of eccentrics 62—62 (Figures 6 and 7) mounted upon a shaft 63 journalled in bearings 64. Shaft 63 is rotated manually by operating either of the levers 27—27 which are located in opposite ends of the machine. These levers are fixed upon a shaft 65 also journalled in the machine frame and connected to eccentric shaft 63 by a pair of gears 66 and 67 (Figures 1 and 5). These gears increase the rotary motion imparted by levers 27 so that approximately a quarter rotation of shaft 65 produces a half rotation of shaft 63, thus moving the positioning block assembly 22 from the fully elevated position of Figure 7 to the lowered position shown in Figure 8.

As shown in Figures 6 and 7, the opposite ends of bar 58 are slideably guided in slots 68—68 formed in the end plates 69 which are secured to opposite ends to the angles 29—29. The inner edges of these angles are spaced apart sufficiently to provide clearance for the bar 58 and the bar is maintained longitudinally in position by means of end plates 70—70 secured upon the plates 69.

*Upper feed roller assembly*

The upper and lower feed units 17 and 23 are substantially in duplicate, each comprising a set of three equally spaced rollers having staggered grooves 71 arranged to frictionally engage the turns of the helical wire 18 as it is introduced manually at the receiving end of the feeders (Figures 3, 5 and 6). The grooves 71 of each roller are spaced apart longitudinally a distance corresponding to the lead of the helical wire so as to engage the wire at a number of points along its length. For this purpose, the sets of grooves of each roller are staggered with respect to one another in accordance with the angular relationship of the rollers about the helical. The groove arrangement of the rollers provides a purchase axially with the helical so that it is fed forwardly in a positive manner by the frictional engagement of the rollers.

Both roller assemblies are driven in common from the motor 24 as previously noted; however, since the helical wire issuing from the upper set of rollers, is guided manually, the upper assembly is driven more slowly than the lower. For this purpose the upper roller assembly is connected by a sprocket chain 72 to a sprocket 73 (Figures 2 and 5) mounted on the motor shaft while the lower assembly is driven by a sprocket chain 74 passing over a larger sprocket 75, also mounted upon the motor shaft. The respective rollers of each assembly are provided with sprockets 76 of uniform size and the respective sprocket chains 72 and 75 pass around the three sprocket wheels in the manner illustrated in Figure 4 so as to drive the rollers of both assemblies in the same direction. By virtue of the differential pitch diameter of the driving sprockets 73 and 75 of the motor shaft, the feed rate of the upper rollers is substantially less than the rate of the lower rollers.

In feeding the helical wires into the upper feeder, the operator separates the rollers to facilitate insertion and then applies pressure to engage and advance the helical. This also increases the feeding pressure of the lower feeder. For this purpose the engagement of both feeders is regulated by the treadle 25 which extends for the full length of the machine as shown in Figures 1 and 2, so arranged that foot pressure of the operator applies feeding pressure to upper feeder rollers. The treadle permits the operator to guide the leading end of the upper helical wire as it advances from coil to coil and to stop it at any point along the machine in case it becomes fouled. The wire issues continuously from the lower rollers and the treadle operation intermittently increases its feeding pressure to jog the lower helical should it become stuck.

As shown in Figures 1 and 2, treadle 25 for controlling the feed rollers is pivotally mounted as at 77—77 at opposite ends of the machine frame and its left end includes a lever extension 78 connected at its swinging end to a link 80. Link 80 is pivotally connected as at 81 to the swinging end of lever 78 and its upper end is pivotally connected as at 82 to a rocking lever 83 pivotally mounted as at 84 to the machine frame. A vertical push rod 85 is pivotally connected as at 86 to lever 83, the upper end of the push rod being connected to a lever 87 arranged to open and close the upper feed unit as hereinafter disclosed.

As shown in Figures 3 and 5, lever 87 is secured to a swinging yoke 91 which carries the top feed rollers 92 cooperating with a bottom roller 89, the yoke being pivotally mounted as at 88 upon a bracket plate 90, so that swinging movements of the lever will raise and lower the yoke and top rollers with respect to the bottom roller. The top feed rollers 92—92 of the set are divided longitudinally into the three sections and are pinned as at 93 to the shafts 94—94, the yoke being provided with journals for these shafts. The swinging yoke 91 is a duplicate of the yoke for the lower feed unit illustrated in Figure 6; therefore, this view may be referred to in the description of both assemblies.

As shown in Figure 6, the yoke includes three limbs 95 to provide spaces for the sprockets 76 and the roller sections, the shafts 94 being journalled in these limbs and the sprockets 76 being pinned to the outer ends of the respective shafts in the same manner as the roller sections. A cover plate 96 overhangs the sprockets 76 and is secured by screws 97 to the intermediate limb of the yoke as viewed in Figure 3, while the cover plate for the lower assembly is secured to the left limb as shown in Figure 6.

It will be noted in Figure 5 that the limbs 95 are provided with semi-circular recesses 98 formed in their lower surfaces intermediate the upper rollers. These recesses are in alignment with one another to form a longitudinal passageway for the advancing helical. When the yoke is lowered, the open recesses are presented to the lower roller, such that the three rollers engage the helical at equidistant points around its periphery. The sprocket arrangement is substantially the same for the upper and lower feed unit and in both cases, the driving sprockets 76 are somewhat smaller than the diameter of the rollers so that the helical may pass without interference with the sprocket teeth.

Upon the left limb 95, as viewed in Figure 3, there is provided an outwardly projected guide 99 having an upwardly facing semi-circular recess 100. This recess is in longitudinal alignment with the recesses 98 and guides the leading ends of the helicals into the feed unit as they are manually inserted. After passing through the feed unit, the leading end of the helical is guided manually upon the mating terminal coil offsets, the top terminal coils being held in position between the spaced collars 101 secured upon the bar 102, as shown in Figures 1 and 3.

The mounting bracket 90 is secured upon a standard 103, having its lower end secured upon a plate 104. Plate 104 is spaced slightly above the table top as shown in Figure 5 and provides a sliding clearance for the indexing bar 26, hereinafter described in detail. Bracket 90 is secured by screws 105 to the top of standard 103 and its opposite edge includes three limbs 95a, corresponding to the limbs 95 of the movable yoke 91 and in alignment therewith. The bottom roller 89 is constructed in sections interposed between the limbs and pinned to the lower shaft 94a. A driving sprocket 76a as shown in Figure 4, is pinned upon the outer end of the shaft. The opposite edge of the bracket plate 90 is provided with a pair of spaced ears 106—106 (Figure 3) for mounting the pivot pin 88.

The upper rollers are shown in open position in Figure 5 and are brought into operating engagement when the treadle 25 is depressed. When the treadle is depressed, the vertical rod 85 is forced downwardly against the tension of spring 107, the yoke lever 87 being engaged by a collar 108 pinned upon the upper end of the rod. Rod 85 includes a stop collar 110 which is adapted to engage the angle iron 111 and thereby to limit the open position of the yoke. In addition, a collar 112 is pinned to the rod below the yoke lever 87 so that the lever is confined between collars 108 and 112.

When the operator releases treadle 25, the upper feed rollers are separated automatically by a spring 113 having its lower end anchored upon a bar 114 and its upper end anchored upon a lever extension 115 which is secured to yoke 91 by the screws 116 as shown in Figure 5. Bar 114 is pinned as at 117 to a yoke 118 of the lower feed unit 117. Spring 113 is under constant tension to provide the constant feeding pressure even when the upper feeder is released; thus, it will be apparent that the normal pressure is increased when the upper feeder is under pressure.

In order to permit relative movement between the feed rollers while at the same time providing a continuous drive, the sprocket chain 72 is provided with a yieldable idler arrangement as shown in Figures 2 and 5. This arrangement is substantially the same as that of the lower feed roll assembly detailed in Figure 4. As shown in Figure 5, it consists of an idler pulley 120 journalled as at 121 in yoke 91, tracking upon one run of sprocket chain 72 and operating in conjunction with a yieldable pulley 122 tracked against the opposite run of the chain. Pulley 122 is journalled as at 123 on the swinging end of a lever 124 which has its lower end pivoted as at 125 on a bearing block 126.

As shown in Figure 2, there is provided a counterweight 127 connected by means of a chain 128 to the lever 124, arranged to urge the lever and pulley 122 upwardly against the sprocket chain counterweight. Chain 128 passes through a tube 130 which is secured by brackets 131 to the machine frame. It will be apparent that upon separation of the feed rollers, pulley 122 will be forced outwardly against the biasing load of counterweight 127 and when the rollers are brought together, the counterweight will take up the slack, thus maintaining constant tension.

*Lower feed roller assembly*

The lower feed roller assembly is generally similar in construction and operation to the upper assembly except that it is under constant feeding pressure which is increased when the treadle is depressed. Since the arrangement is similar, duplicate numerals are applied to corresponding parts of both assemblies. As best disclosed in Figures 4, 5 and 6, the top rollers 92—92 are movable with respect to the bottom roller and are journalled in the swinging yoke 118 which is pivoted as at 117 in a bracket plate 132 secured upon the machine frame. As shown in Figure 3, this yoke is substantially the same as the upper yoke and includes the spaced limbs 95 for journalling the roller sections. Bracket 132 is provided with corresponding limbs 95a which underlie the yoke limbs 95, there being provided aligned semi-circular recesses 98 formed in the yoke limbs for the passage of the helical wire.

The upper and lower rollers are provided with staggered grooves 71 for engagement and advancement of the helical and in this case the grooves are related to the teeth 54 of the positioning blocks so that the leading end of the helical advances into positive engagement with the teeth as it issues from the rollers as shown in Figure 6. The teeth of the several positioning blocks are also related to one another corresponding to the lead of the helical so that there is no interference as the leading end of the helical advances from one set of blocks to the next. Thus, the leading end of the wire is presented automatically to the teeth and threads its way around the mating offsets as it progresses down the successive springs.

The bottom roller 89 is keyed to the shaft 94a and the shaft is rotatably journalled in the limbs 95a similar to the shaft of the upper assembly. These limbs extend from the bracket 132, the yoke 118 being pivoted by the pin 117 passing through the lugs 106 rising upwardly from the bracket. The bracket in turn is secured by the screws 105 passing into the forward angle iron 29 as shown in Figure 5.

It will be noted in Figures 5 and 8 that the elevating bar 58 of the positioning blocks interfits the limbs 95a, the limbs being slightly smaller than the longitudinal slot 133 in which the positioning blocks 55—55 are clamped. Thus, the positioning bar is free to be raised and lowered with respect to the fixed lower roller. It will also be noted in Figure 5 that a spacer block 134 is interposed between the bracket 132 and the angle iron 29 to locate the roller assembly in horizontal alignment with the spring assembly. A cover plate 96 is applied to the outer limb 95 of the yoke in a position to overhang the sprocket chain and sprockets, the cover plate being secured by screws 97, as shown in Figure 6.

The yoke of the lower feed unit is interconnected with the upper yoke by a yieldable connection arranged to actuate the lower assembly 17 when the yoke of the upper assembly is lowered. As best shown in Figure 5, this connection consists of the lever 115 extending forwardly from the upper yoke and the corresponding lever 114 extending from the lower yoke, with their outer ends joined by the tension spring 113 having its opposite ends anchored to the respective levers as at 135 and 136. It will be apparent that upon operation of the treadle to bring the upper yoke into operating engagement, lever 115 will swing upwardly applying increased tension to spring 113, thereby increasing the feeding pressure of the lower feeder. By this arrangement, spring 113 normally exerts sufficient tension to feed the helical automatically; however, should resistance develop, causing the helical to stall, operation of the upper feeder by the treadle will intermittently increase the pressure and jog the helical through.

Since the lower helical is guided in a positive manner during advancement, and the lower yoke is placed under constant pressure independently of treadle pressure, the helical will be advanced automatically upon being inserted in the lower feed unit and will stop automatically when its trailing end passes from the rollers.

Relative movement between the top and bottom rollers of the lower assembly, in response to movements of the yoke, are provided by the sprocket chain arrangement shown in Figure 4. As shown, the chain 74 is guided around the three sprockets by means of the idlers 120 and 122, idler 120 being journalled in the yoke 118 and idler 122 being journalled upon the end of a swinging lever 124. This arrangement is substantially the same as previously described in connection with the upper assembly, but in this instance the lower idler 122 is yieldably urged against the lower run of the procket chain by a tension spring 137 instead of the counterweight 127 previously described. As shown in Figure 2, the arm 124 is pivotally mounted as at 138 upon a bracket plate 140 which is secured to the end plate 69. Arm 124 includes an extension 141 having its lower end extending downwardly into connection with the tension spring.

Pulley 122 thus is yieldably urged upwardly against the chain and when the lower yoke and rollers are elevated to relaxed position, the yieldable idler will shift downwardly. When the yoke is moved into operating engagement, the idler will move upwardly under influence of spring 137 to take up the slack in chain 74.

*Indexing mechanism*

As previously noted, the assembled coils are advanced by the indexing mechanism 26 in stepwise fashion across the support table 30 as each successive row of coils is added to the assembly. As shown in Figures 3, 5 and 7, the indexing apparatus consists essentially of a transversely movable rail 142 extending longitudinally across the table surface 30 and carrying upon its upper surface a series of coil engaging spurs 143 located in alignment with the individual coil springs and engageable with the lower terminal coil of each. Rail 142 is provided at opposite ends with vertical plates 144 extending downwardly over the edge of the machine frame as shown in Figures 2 and 5.

The indexing rail is reciprocated by means of the manual levers 37—37 secured at opposite ends upon a shaft 145 journalled along the forward portion of the machine frame. Also secured upon opposite ends of shaft 145 is a pair of rail shifting levers 146, each lever having upon its swinging end a pin 147 slideably engaged in a slot 148 formed in the vertical plates 144—144 (Figure 5). In the position shown in Figure 7, the indexing rail is at its outward limit of travel with the coils engaged against the abutment 150 of the spurs 143. When the lever 146 is elevated, the rail will shift rearwardly as shown in Figure 8, thus pushing the spring assembly rearwardly and drawing the last assembled row of coils from the retainer limbs to a position in alignment with the positioning blocks.

As shown in Figure 2, adjustable stops 151—151 may be mounted upon an angle iron 111 in a position to engage the lever 146 at its forward and rearward limits of travel so as to regulate the movement of the spurs 143 in accordance with the diameter of the coil springs. As the indexing rail is moved outwardly, the spurs slide beneath the terminal coils of the last joined row of springs as shown in Figure 7. For this purpose the upper edge of the spur is inclined as at 152 so as to produce a camming action as it encounters the coils. The operating stroke in the outward direction is sufficient to carry the spurs slightly beyond the terminal coils which they engage in the manner shown in Figure 3.

At the start of an operation, the first two rows of springs are placed manually in the machine with their offsets nested in the positioning blocks. After this row has been connected at top and bottom by helicals, the operator releases treadle 25 and actuates one of the manual levers 37 to index the connected rows of coil springs rearwardly, causing the first row of springs to move to the position shown in Figure 7 with the tops of the coils positioned between the collars 101 of cross shaft 102. The collars 101 stabilize the top terminal coils of succeeding rows during threading of the helical wire upon them. As succeeding rows are joined and indexed, the top terminals pass automatically between the collars for lateral stabilization to facilitate the application of the helical. The helicals are preferably cut to length so that the feeding operation stops automatically when the trailing end of the helical passes from the feed rollers.

As shown in Figure 1, motor 24 may be started and stopped at the front of the machine by actuation of the push button switch 153. In addition, there is provided a reversing switch 154 by means of which the motor may be reversed so as to back off the helical in case of accident or improper threading. Reversing switch 154 is actuated by means of a bar 155 which depends downwardly at the front of the machine and which is provided with a switch actuating finger 156 arranged to depress stem 157 of the reversing switch. Bar 155 is substantially coextensive with the machine to permit immediate operation at any point along the machine during the threading of the helical wire, the bar being mounted upon hangers 158—158 having their upper ends pivotally connected to a rod 160. The opposite ends of rod 160 are supported by bearing blocks 161—161 which are secured to the machine frame. The arrangement is such that the operator can reverse the motor by pushing his body against bar 155, thus leaving the hands free for guiding the leading end of the helical wire.

The reversing switch is arranged to operate the motor in reverse so long as the bar is depressed and to energize the motor forwardly as soon as the bar is released. By this arrangement the operator can back off the helical sufficiently to correct any misthreading and immediately advance it under manual guidance to correct any improper condition efficiently. This arrangement is of primary utility in threading the upper terminals since this is a hand operation.

We claim:

1. A spring receiving section for a machine for assembling rows of coil springs, each consisting of an individual spiral coil having respective terminal coils at upper and lower ends, said spring receiving section comprising, a base plate mounted at the receiving side of the machine and extending longitudinally thereof in a horizontal plane, a series of spacer elements projecting upwardly from the upper surface of the base plate at longitudinal spacing corresponding to the diameter of the lower terminal coils, respective retainer limbs mounted upon the upper ends of the spacers, said retainer limbs extending outwardly from the spacers and being generally parallel to the horizontal and vertical planes of the base plate, the outer portions of the retainer limbs being spaced upwardly from the base plate a distance corresponding to the portion of the spiral coil rising upwardly from the lower terminal coil, the individual coil springs being inserted transversely across the base plate and between said spacers, the retainer limbs providing a wedging engagement with respect to said portion of the spiral coil to force the lower terminal coil into pressure engagement with the base plate, said spacers providing a series of abutments engaging diametrically opposite sides of the terminal coils and locating the same at uniform spacing lonigtudinally relative to one another, whereby the individual coil springs are confined in row formation and in mating relationship with an assembled row of springs in position to be tied thereto.

2. A spring receiving section for a machine for assembling rows of coil springs, each consisting of an individual spiral coil having respective terminal coils at upper and lower ends, said spring receiving section comprising a base plate mounted at the receiving side of the machine and extending longitudinally thereof in a horizontal plane, a series of spacer elements projecting upwardly from the upper surface of the base plate at longitudinal spacing corresponding to the diameter of the lower terminal coils, a series of retainer limbs mounted upon the upper ends of the spacers, said retainer limbs extending outwardly from the spacers and disposed generally parallel to the horizontal and vertical planes of the base plate, the outer portions of the retainer limbs being configurated to reside above the base plate at an elevation corresponding to the plane of the spiral coils rising upwardly from the lower terminal coils, the individual coil springs being inserted transversely across the base plate and between the spacers, each retainer limb providing a wedging engagement with respect to the spiral coil rising above the lower terminal coil to force the lower terminal coil into pressure engagement with the base plate, said spacers being located along a longitudinal axis located relative to the inner edge of the base plate a distance less than the radius of the lower terminal coils, said spacers providing a series of abutments engaging diametrically opposite sides of the terminal coils and locating the same at uniform spacing longitudinally relative to one another, whereby the individual coil springs are confined in row formation with the leading portions of the lower terminal coils overhanging the inner edge of the base plate in positions to mate with an assembled row of springs to be tied thereto.

3. A spring receiving section for a machine for assembling rows of individual coil springs, each consisting of a spiral coil having respective upper and lower terminal coils at opposite ends, said spring retaining mechanism comprising, a base plate extending longitudinally along the receiving side of the machine and disposed in a horizontal plane, a series of spacer elements mounted upon said base plate and rising upwardly therefrom, a series of spring retainer limbs mounted upon the spacers, said limbs being generally parallel to the horizontal and vertical planes of the base plate and extending in cantilever fashion beyond the spacers, the outer end portion of adjacent limbs being disposed in alternate elevations above the base plate, said spacers being spaced apart longitudinally with respect to one another a distance corresponding to the diameter of the lower terminal coils to provide abutments engaging the same on diametrically opposite sides, the alternate elevations of adjoining retainer limbs corresponding to the planes of adjacent spiral coils rising from the lower terminal coils, the coil springs being inserted transversely across the base plate with the outer end portions of adjacent limbs engaging the rising spiral coil and wedging the same downwardly upon insertion of the coil springs, whereby the retainer limbs are effective to compress said rising spiral coils and force the lower terminal coils under pressure engagement upon the base plate to retain said coil springs in row formation and in mating relationship with an assembled row of coil springs.

4. A spring receiving and positioning section for a machine for assembling rows of coil springs, each consisting of an individual spiral coil having respective upper and lower terminal coils at opposite ends, the machine having a helical feeder arranged to rotate and thread a helical wire upon mating portions of the lower terminal coils of adjacent rows of springs, said spring receiving and positioning mechanism comprising, a base plate extending longitudinally along the front of the machine and disposed generally in a horizontal plane, a series of spacers mounted upon said base plate and projecting upwardly therefrom, said spacers being spaced apart longitudinally from one another a distance corresponding to the diameter of the lower terminal coils to receive the terminal coils therebetween, a series of spring retainer limbs mounted upon the upper ends of the spacers and extending outwardly from the spacers, said retainer limbs being spaced above the base plate and generally parallel thereto, the ends of the retainer limbs being disposed at an elevation above the base plate corresponding to the plane of the spiral which rises upwardly from the lower terminal coil, said retainer limbs providing a wedging engagement effective to compress said spiral coil and clamp the lower terminal coil upon said base plate when said coil spring is advanced transversely across the base plate and between the spacers, a series of vertically shiftable spring positioning members disposed along the inner edge of the base plate, said spacers being located adjacent the inner edge of the base plate a distance less than the radius of the lower terminal coils, whereby the leading portions of the terminal coils overhang said edge, said positioning members each constituting a pair of spaced jaws providing an open throat facing upwardly and straddling the overhanging portions of the terminal coils upon being shifted upwardly, said positioning jaws confining said portions of the bottom terminal coils in mating relationship with corresponding portions of an assembled coil spring, said jaws effective to guide the helical wire upon said mating portions upon advancement thereof by said helical feeder.

5. A spring receiving and positioning section for a machine arranged to assemble rows of coil springs, each consisting of an individual spiral coil having respective upper and lower terminal coils at opposite ends, the machine having means arranged to rotate and thread a helical wire upon mating portions of the lower terminal coils of adjacent rows of springs, said spring receiving and positioning mechanism comprising, a base plate extending longitudinally along the front of the machine and disposed generally in a horizontal plane, a series of spacers mounted upon said base plate and projecting upwardly therefrom, said spacers being spaced apart longitudinally from one another a distance corresponding to the diameter of the lower terminal coils to receive the terminal coils therebetween, a series of spring retainer limbs mounted upon the upper ends of the spacers and extending outwardly from the spacers, said retainer limbs being spaced above the base plate generally parallel thereto and having ends disposed at an elevation above the base plate corresponding to the plane of the spiral which rises upwardly from the lower terminal coil, said retainer limbs providing a wedging engagement effective to compress said spiral coil portions and clamp the lower terminal coil upon said base plate when said coil spring is advanced transversely across the base plate and between said spacers, said spacers being located adjacent the inner edge of the base plate a distance less than the radius of the lower terminal coils, whereby the leading edges of the terminal coils overhang said edge and in mating relationship with a joined row of coil springs to be joined thereto by said helical wire, and an indexing mechanism arranged to advance the joined row transversely from the receiving and positioning section, said indexing mechanism comprising a transversely movable rail extending parallel to said base plate and movable in a horizontal plane generally common to the plane of the base plate and having a series of spurs, each of the spurs having an upper surface inclined upwardly relative to the inner edge of the base plate and having a shoulder facing inwardly, the spurs being effective to cam the overhanging joined coils upwardly during motion toward the base plate and to engage the same and thereby shift the joined coils inwardly across the base plate and between the spacers during motion of said rail away from the base plate.

6. A spring retaining mechanism for a machine arranged to assemble rows of coil springs, each consisting of an individual spiral coil having upper and lower terminal coils at opposite ends, said spring retaining mechanism comprising, a base plate extending longitudinally along the front of the machine and disposed generally in a horizontal plane, a series of spacers mounted upon said base plate and projecting upwardly therefrom, said spacers being spaced apart longitudinally from one another a distance corresponding to the diameter of the lower terminal coils to receive the terminal coils therebetween, the spacers being located adjacent the inner edge of the base plate a distance less than the radius of the lower terminal coils, whereby portions of the coils overhang said edge when inserted between the spacers, a series of spring retainer limbs mounted upon the upper ends of the spacers and extending outwardly from the spacers, said retainer limbs being spaced above the base plate and generally parallel thereto and disposed at an elevation above the base plate corresponding to the spiral coil which rises upwardly from the lower terminal coil, said retainer limbs providing a wedging engagement effective to compress said spiral coil portions and clamp the lower terminal coil upon said base plate when said coil spring is advanced transversely across the base plate and between said spacers, a series of vertically shiftable spring positioning members disposed along the inner edge of the base plate, said positioning members each constituting a pair of spaced jaws providing an open throat facing upwardly and straddling the overhanging portions of the terminal coils upon being shifted upwardly, the jaws confining said overhanging portions in mating relationship with corresponding portions of an assembled row of coil springs for threading thereon a helical wire, and indexing mechanism comprising a transversely movable rail extending parallel to said base plate and movable in a horizontal plane and having a series of spurs mounted thereon, each of the spurs having an upper surface inclined upwardly and rearwardly relative to the inner edge of the base plate and providing a shoulder facing inwardly, the spurs being effective to cam the overhanging portions upwardly during motion toward the base plate for engagement by said shoulders and to shift the coils inwardly across the base plate and between the spacers during motion of said rail away from the base plate.

References Cited in the file of this patent
UNITED STATES PATENTS

| | | |
|---|---|---|
| 1,817,087 | Lofman | Aug. 4, 1931 |
| 1,864,216 | Poyner | June 21, 1932 |
| 1,905,459 | Gail | Apr. 25, 1933 |
| 1,920,862 | Heuer | Aug. 1, 1933 |
| 1,941,657 | Bronstien | Jan. 2, 1934 |
| 2,026,276 | Erickson | Dec. 31, 1935 |
| 2,031,894 | Krakauer | Feb. 25, 1936 |
| 2,064,560 | Olson | Dec. 15, 1936 |
| 2,112,991 | Madden | Apr. 5, 1938 |
| 2,176,262 | Kirchner | Oct. 17, 1939 |
| 2,177,054 | Catini | Oct. 24, 1939 |
| 2,231,744 | Zimmerman | Feb. 11, 1941 |
| 2,286,326 | Zimmerman | June 16, 1942 |
| 2,296,878 | Saval | Sept. 29, 1942 |
| 2,388,106 | Woller | Oct. 30, 1945 |
| 2,470,812 | Gauci | May 24, 1949 |